United States Patent
Margalit

(10) Patent No.: US 10,293,317 B2
(45) Date of Patent: May 21, 2019

(54) MULTI-CHANNEL GRAVIMETRIC BATCH BLENDER

(71) Applicant: O.E.D.A. LIAD HOLDINGS (2006) LTD., Misgav Industrial Park (IL)

(72) Inventor: Eli Margalit, Moshav Yaad (IL)

(73) Assignee: O.E.D.A. LIAD HOLDINGS (2006) LTD., Misgav Industrial Park (IL)

(*) Notice: Subject to any disclaimer, the term of this patent is extended or adjusted under 35 U.S.C. 154(b) by 0 days.

(21) Appl. No.: 15/525,233

(22) PCT Filed: Nov. 19, 2015

(86) PCT No.: PCT/IL2015/051111
§ 371 (c)(1),
(2) Date: May 8, 2017

(87) PCT Pub. No.: WO2016/079738
PCT Pub. Date: May 26, 2016

(65) Prior Publication Data
US 2017/0320029 A1 Nov. 9, 2017

(30) Foreign Application Priority Data
Nov. 20, 2014 (IL) .......................................... 235828

(51) Int. Cl.
*B01F 15/00* (2006.01)
*B01F 15/04* (2006.01)
(Continued)

(52) U.S. Cl.
CPC ...... *B01F 15/0445* (2013.01); *B01F 13/1005* (2013.01); *B01F 13/1066* (2013.01);
(Continued)

(58) Field of Classification Search
CPC .............. B01F 15/0445; B01F 13/1005; B01F 13/1066; B29B 7/244; B29B 7/603;
(Continued)

(56) References Cited

U.S. PATENT DOCUMENTS 2,105,266 A  1/1938 Rendall
3,959,636 A  5/1976 Johnson
(Continued)

FOREIGN PATENT DOCUMENTS

CH  459061  6/1968
CN  1053755 A  8/1991
(Continued)

OTHER PUBLICATIONS

Supplementary Partial European Search report for a counterpart foreign application—EP 1586 0180—dated Jun. 19, 2018 (10 pages).

(Continued)

*Primary Examiner* — Anshu Bhatia
(74) *Attorney, Agent, or Firm* — Roach Brown McCarthy & Gruber, P.C.; Kevin D. McCarthy

(57) ABSTRACT

A weighing apparatus for the preparation of a mixture of granular components that comprise batches of material required by a plurality of processing machines in a plant for the manufacture of plastic products is described. The apparatus comprises a Multi-Channel Gravimetric Batch Blender (MCGBB) configured to weigh predetermined weights of the raw materials and to combine the weighed portions of raw materials into batches according to a predetermined recipe for each processing machine and a computer that controls the operation of all components of the MCGBB. The MCGBB comprises several weighing units arranged in a way that allows material weighed in each of the weighing units to fall through individual chutes via a common funnel (Continued)

into a manifold that distributes the weighed batches to several processing machines via a system of delivery pipes.

7 Claims, 7 Drawing Sheets

(51) Int. Cl.
| | |
|---|---|
| *B29C 48/92* | (2019.01) |
| *B29C 48/285* | (2019.01) |
| *B65G 47/72* | (2006.01) |
| *B01F 13/10* | (2006.01) |
| *B29B 7/60* | (2006.01) |
| *B29B 7/24* | (2006.01) |
| *B29C 48/25* | (2019.01) |

(52) U.S. Cl.
CPC .............. *B29B 7/244* (2013.01); *B29B 7/603* (2013.01); *B29C 48/286* (2019.02); *B29C 48/92* (2019.02); *B65G 47/72* (2013.01); *B29C 48/2567* (2019.02); *B29C 2948/92676* (2019.02); *B29C 2948/92828* (2019.02); *B29C 2949/78* (2013.01); *B29C 2949/78638* (2013.01)

(58) Field of Classification Search
CPC ... B29C 47/1009; B29C 47/92; B29C 47/083; B29C 2947/92676; B29C 2947/92828; B29C 2949/78; B29C 2949/78638; B65G 47/72
See application file for complete search history.

(56) References Cited

U.S. PATENT DOCUMENTS

| | | |
|---|---|---|
| 4,498,783 A | 2/1985 | Rudolph |
| 4,525,071 A | 6/1985 | Horowitz |
| 4,623,056 A | 11/1986 | Flaugher |
| 5,147,152 A | 9/1992 | Link |
| 5,148,943 A | 9/1992 | Moller |
| 5,286,437 A | 2/1994 | Severienc |
| 5,627,346 A * | 5/1997 | Weibel ................ B01F 15/0201 366/141 |
| 2003/0185094 A1* | 10/2003 | Packard ............ B01F 15/00415 366/141 |
| 2011/0211418 A1* | 9/2011 | Tassone .............. B01F 13/1005 366/8 |

FOREIGN PATENT DOCUMENTS

| | | |
|---|---|---|
| CN | 1723162 A | 1/2006 |
| DE | 2247518 B2 | 8/1974 |
| IL | 230756 | 7/2015 |
| WO | 2008/149190 A1 | 12/2008 |
| WO | 2015/107517 A1 | 7/2015 |

OTHER PUBLICATIONS

Israeli Patent Application IL230756, titled Weighing and Feeding System, filed on Jan. 30, 2014.
International Search Report for PCT/IL2015/051111, dated Feb. 21, 2016, 4 pages.
Written Opinion of the International Searching Authority for PCT/IL2015/051111, dated Feb. 21, 2016, 6 pages.
Office action from a foreign patent office (China Patent Office) in a counterpart foreign application 100080, dated Feb. 3, 2019; 10 pages; and translation 8 pages.

* cited by examiner

MULTI-CHANNEL GRAVIMETRIC BATCH BLENDER

FIELD OF THE INVENTION

The invention is from the field of weighing material for industrial processes. Specifically the invention is from the field of weighing mixtures of material and distributing them to processing machines in a plant that produces plastic products.

BACKGROUND OF THE INVENTION

In the modern world plastics are the material of choice for the manufacture of a seemingly unlimited number of products. These products are produced by a variety of industrial processes, e.g. injection molding, blow molding, extrusion, and 3-D printers. The raw material that is fed into the machines used to produce the final products is a mixture consisting of: polymers (called resin in the industry), colorants and other additives, e.g. UV inhibitors, all in the form of small beads. The colorants and other additives are supplied as masterbatches, which are concentrated mixtures of pigments and/or additives encapsulated during a heat process into a carrier resin which is then cooled and cut into a granular shape.

Today it is customary in the plastic industry to feed the processing machines e.g. injection molding machines, blow molding machines, extrusion machines, either with pre-mixed plastic formulations or, as it is applied in most of the cases, by feeding the processing machines directly by means of gravimetric blenders that weigh and blend the various components based on their weight settings. In a large facility a common way to deliver mixtures of raw materials is as follows: The premixed formulations are prepared in a Remote Central Gravimetric Blenders (RCGB) by mixing resins, colored masterbatch and additives by each of its gravimetric blenders to achieve the desired qualities and color and then transported to the individual processing machine. In some cases the colored masterbatch is fed directly to the neck of the processing machine by a single component gravimetric or volumetric feeder.

Typically a large manufacturing facility comprises many processing machines in order to be able to simultaneously produce several different products. In order to do this a large facility can have a RCGB that is comprised of many gravimetric blenders, each of which is feed with the required type of raw material from a plurality of storage silos. The RCGB is a complex of gravimetric blenders each of which comprises several bins, i.e. hoppers or several compartments in a hopper. The number of components each gravimetric blender is capable of blending depends on the number of its bins. On each bin is installed a hopper loader feeder in order to convey into it raw materials from the proper silo.

When the gravimetric blender operates, the unit desirably operates automatically, adding each of the component solid materials in the proper, desired weight. Each solid material component is dispensed by weight into a single weigh bin. Once the proper amount of each component has been serially dispensed into the weigh bin, all of the components are dropped together into a mixing chamber from the weigh bin.

When mixing in the mixing chamber is complete, the resulting blend can be provided to an interim container preferably underneath the blender, used as a buffer and then passes through an automatic manifold that automatically allows every blend produced by a defined remote gravimetric blender to be conveyed through a pipe to any chosen processing machine that is related to the same automatic manifold. The automatic manifolds are in principle constructed at least from two similar base units connected via a pipe. One of the base units is connected to the inlet pipes that arrive from the gravimetric blenders or its buffers and the other is connected to the outlet pipes that are connected to the processing machines.

FIG. 1 schematically shows a typical prior art RCGB 10 comprised of four or more gravimetric blenders 12. Each gravimetric blender 12 comprises four bins 14, which are fed with the required raw material from one of six or more silos 16. Material from each bin 14 drops into weighing hopper connected to load cell 18. The material from each bin is weighed separately in serial fashion and only when the required amounts of all of the materials have been weighed is the batch allowed to drop into mixer 20, which is then activated. After the batch has been thoroughly mixed it drops into a buffer or to an automatic manifold 22 and is routed to the correct process machine 24.

FIG. 2A and FIG. 2B are drawings symbolically showing a RCGB at a large manufacturing plant for producing plastic products. Seen in the drawings are an overall view of the RCGB in FIG. 2A and the automatic manifolds of the gravimetric blenders with pipes leading from the mixers into the manifold at the top and pipes leading to the process machines at the bottom of the manifolds in FIG. 2B.

The prior art RCGB has a number of disadvantages:

1. Cost—A typical RCGB for a plant that comprises ten silos to hold different raw materials to blend batches that comprise no more than four of the raw materials to supply 100 injection machines can require for example 60 four-bin gravimetric blenders in order to have maximum adaptability.
2. They occupy a great deal of space. The RCGB just described would require 200-300 of square meters of floor space.
3. Complexity—FIG. 2B gives a brief glance at the large number of delivery pipes that run from the manifolds to the 100 processing machines. In addition each of the 240 bins in the gravimetric blenders is connected to one of the ten silos. Installation and maintenance of this complex piping system is time consuming and expensive.
4. Possibility of contamination—To produce high quality products having consistent properties such as strength and color the weight of each component of the batch must be very carefully controlled and in some instances contamination by only a few beads of material can affect the properties of the product. If it is desired to change the type of material in one or more of the bins in a gravimetric blender, then that blender's operation must cease and a cleaning process carried out in order to prevent contamination.
5. Uniformity of batches that arrive at the production machines—Although each batch is thoroughly mixed before it enters the manifold, as it travels through the delivery pipe to the production machine, typically by means of a vacuum conveying system, the various ingredients can separate out because of the difference in specific weight of the beads.
6. Speed of production—Because the prior art gravimetric blenders weigh each of the up to four components of a batch in serial fashion it takes a relatively long time for each batch to be prepared and fed to the automatic manifold. In addition there is the down-time of parts of the system required for cleaning to prevent contamination.

Many of these disadvantages of the prior art have addressed in co-owned Israeli Patent Application IL230756, titled Weighing and Feeding System, filed on Jan. 30, 2014.

Unlike a prior art gravimetric blender, in which each component is dispensed separately into a common single weighing chamber and then all components are dropped into a mixing chamber which delivers a homogenous blend to the processing machine, the system of the invention is equipped with a weighing chamber for each component. Therefore the weighing will be done in parallel, thus enabling the use of much smaller load cells and accordingly much better accuracy, yet with a relatively high throughput.

FIG. 3 is a schematic perspective view of the system described in IL230756. The system 30 is a modular one that can be comprised of one or more weighing units 32 arranged in a way that allows the material weighed in each of the units to fall through individual chutes 34 via a common funnel into a mixing machine 36, that combines the output of all of weighing units 32 into a uniform mixture that can be fed into a processing machine. Herein the system 30 is described as one that comprises 12 weighing units 32; however, this is for purposes of illustrating the invention only and, as said, the system can comprise more or less than 12 of these units. Each of the weighing units 32 contains a different type of resin, masterbatch, or additive in granular form. A computer (not shown in the figures) controls the operation of each of the separate weighing units 32 in order to supply the exact weight of each of the individual components to the mixing machine. To prepare a given mixture, the computer will activate only the weighing units 32 that contain the material required for that mixture according to a formulation that has been preloaded into the computer.

Each weighing unit 32 comprises a hopper loader 38 that draws one type of material, i.e. resin, masterbatch, or additive, from a raw material silo into material hopper 40. Hopper 40 has an opening with a flap at its bottom, which is opened and closed when required by an element (not shown in the figure) that is controlled by a system computer (not shown in the figure) to allow a controlled amount of material to fall by gravity into weighing station 42 (hidden behind cover panels 44 where it is weighed on a load cell. When the weight of the material introduced into weighing station 42 and weighed by the load cell is equal to the required weight, then the system computer closes the flap at the bottom of hopper 40 and opens a flap at the bottom of weighing station 42 to allow the material to flow by gravity through chute 34 into mixer 36, where the material is joined by material of other types that has been weighed in parallel by other independent weighing units 32. The combined materials are then mixed thoroughly in mixer 36 and then sent through a manifold to a designated processing machine.

One of the systems 30 described in IL230756 can replace a prior art RCGB comprised of several gravimetric blenders described herein above. Despite the considerable savings in floor space, complexity, and cost made possible by this system, it does not solve all of the problems.

It would be very advantageous for a plastic processing company to have a system for weighing mixtures of material and distributing them to processing machines that overcomes all of the above identified drawbacks of prior art RCGB systems.

It is therefore a purpose of the present invention to provide such a system.

Further purposes and advantages of this invention will appear as the description proceeds.

SUMMARY OF THE INVENTION

In a first aspect the invention is a weighing apparatus for the preparation of a mixture of granular components that comprise batches of material required by a plurality of processing machines in a plant for the manufacture of plastic products. The apparatus comprises:
  a. a Multi-Channel Gravimetric Batch Blender (MCGBB) configured to weigh predetermined weights of the raw materials and to combine the weighed portions of raw materials into batches according to a predetermined recipe for each processing machine, said MCGBB comprising several weighing units arranged in a way that allows material weighed in each of the weighing units to fall through individual chutes via a common funnel into a manifold that distributes the weighed batches to several processing machines via a system of delivery pipes; and
  b. a computer that controls the operation of all components of the MCGBB.

In embodiments of the apparatus of the invention each weighing unit comprises:
  a. a material hopper;
  b. a hopper loader feeder configured to draw one type of raw material from a raw material silo into the material hopper;
  c. a weighing station comprising a load cell;
  d. an opening with a feeding system at the bottom of the material hopper, the feeding system configured to be opened and closed or to be activated on command of the apparatus's computer to allow a controlled amount of material to fall by gravity from the material hopper into the weighing station; and
  e. an opening with a flap at the bottom of the weighing station, the flap configured to be opened and closed on command of the apparatus's computer to allow the weighed amount of material to fall by gravity from the weighing station via the funnel into the hopper In embodiments of the apparatus of the invention the weighing stations work in parallel, each weighing a required amount of material for one component of the batches of material to be delivered to the processing machines according to instructions received from the computer.

In embodiments of the apparatus of the invention, when the computer determines that the correct weight of each of the materials required for a batch to be sent to a specific processing machine has been weighed by one or more of the weighing stations, then the computer opens the flaps at the bottoms of the one or more weighing stations allowing the weighed components of the batch to fall by gravity into the funnel.

In embodiments of the apparatus of the invention, before the weighed amounts of material required for a batch to be supplied to a specific processing machine are allowed to fall into the funnel, the computer activates a motor that rotates a distributor pipe in the manifold, thereby connecting the bottom of the funnel to the delivery pipe that leads to the specific processing machine.

In embodiments of the apparatus of the invention the funnel and distributor pipe in the manifold are automatically cleaned by high pressure air after the preparation of each batch.

In an embodiment of the apparatus of the invention the MCGBB comprises twelve weighing units and supplies batches of material to one hundred injection machines.

In a second aspect the invention comprises a weighing and mixing system for the preparation of a mixture of granular components required by a plurality of processing machines in a plant for the manufacture of a plastic product. The system comprises:
a. a plurality of raw material silos;
b. at least one Multi-Channel Gravimetric Batch Blender (MCGBB) according to claim 1;
c. one mixer unit located at each of the processing machines; and
d. a system of delivery pipes configured to deliver predetermined batches of material from the MCGBB to the mixers at the processing machines.

In embodiments of the system of the invention each silo is connected by piping to at least one weighing unit and each weighing unit is connected to only one silo.

In embodiments of the system of the invention one computer controls the operation of more than one MCGBB.

All the above and other characteristics and advantages of the invention will be further understood through the following illustrative and non-limitative description of embodiments thereof, with reference to the appended drawings.

DETAILED DESCRIPTION OF EMBODIMENTS OF THE INVENTION

The present invention is designed to overcome all of the shortcomings of the Remote Central Gravimetric Blender (RCGB) that is presently used in the plastics industry as is described herein above. The invention accomplishes that goal by providing a Multi-Channel Gravimetric Batch Blender (MCGBB), a single one of which can replace a RCGB comprised of several gravimetric blenders, with the attendant savings in cost, space requirement, and complexity of the piping system. In addition the MCGBB of the invention is comprised of a single weighing unit for each of the components of the batches of material required by the processing machines in the plant allowing the components of each batch to be weighed in parallel, thereby saving time. Other advantages of the MCGBB over the prior art will be described herein below.

The MCGBB is part of a system that comprises at least one MCGBB that weighs material for batches to be supplied to a plurality of processing machines and a mixer that is located at each of the processing machines to enable maximum homogeneity.

Figure 1:
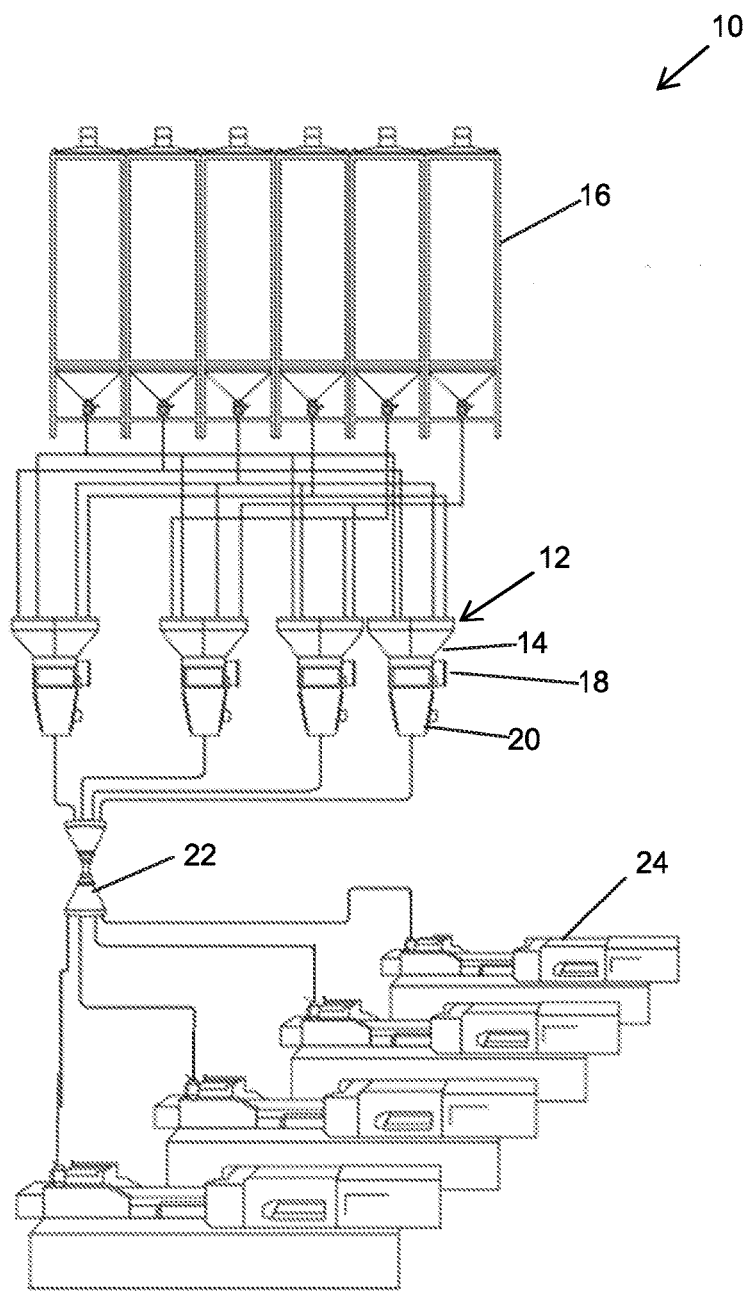
FIG. 1 schematically shows a typical prior art RCGB.
Figure 2A:
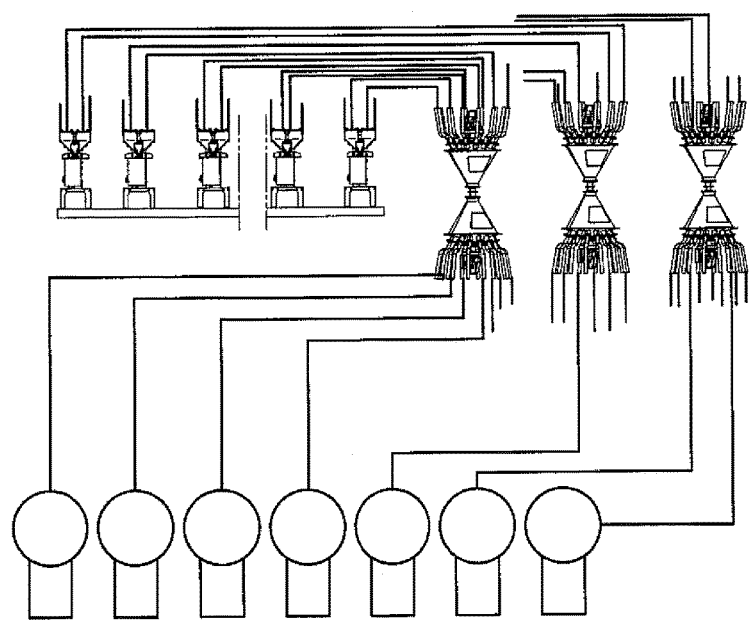
FIG. 2A and FIG. 2B schematically show a portion of the gravimetric blenders in a RCGB at a large manufacturing plant for producing plastic products.
Figure 2B:
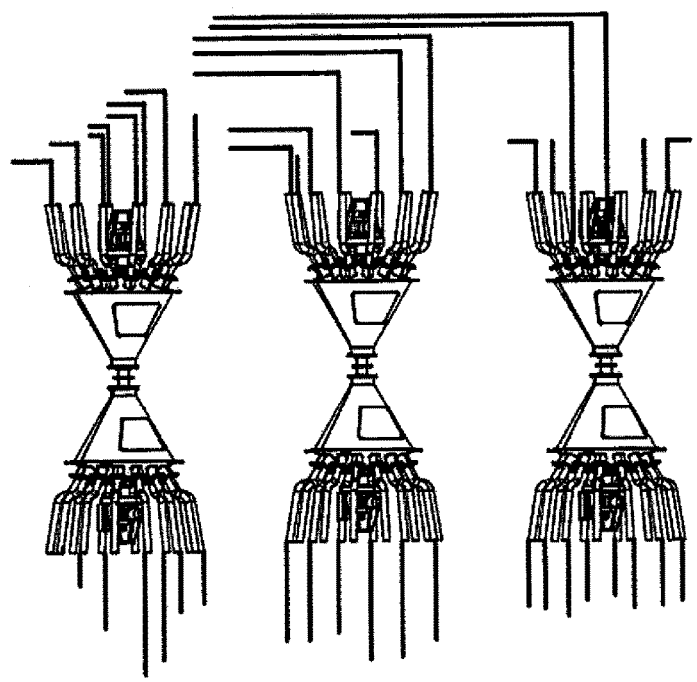
Figure 3:
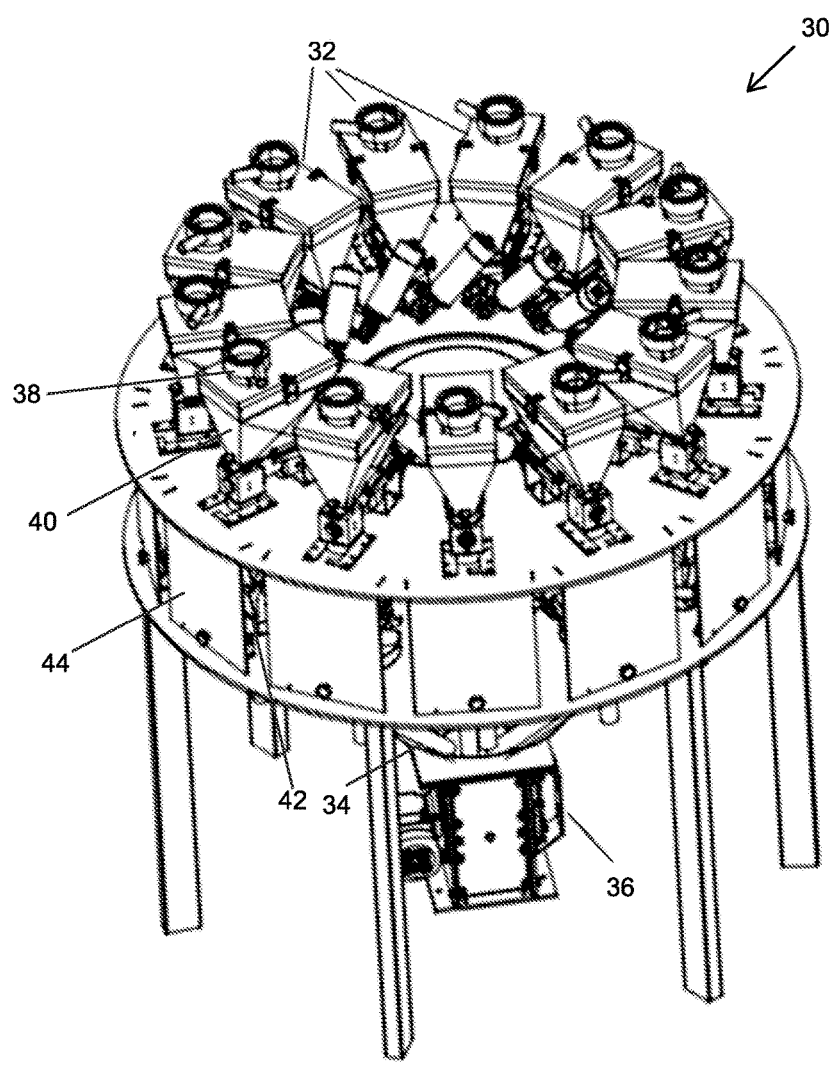
FIG. 3 is a schematic perspective view of a system previously described by the inventor.
Figure 4:
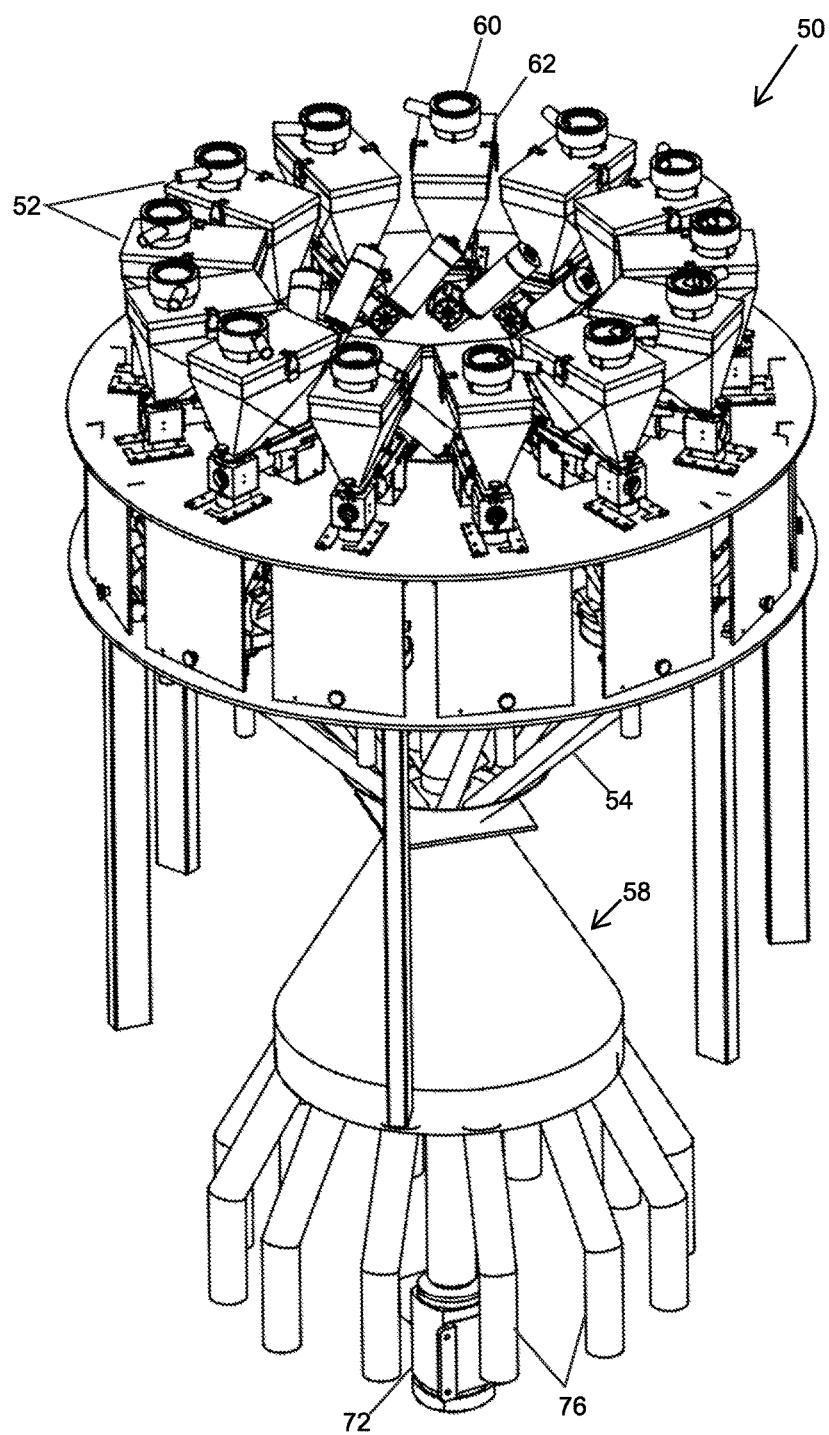
FIG. 4 schematically shows a perspective view of an embodiment of the Multi-Channel Gravimetric Batch Blender (MCGBB) of the invention.
Figure 5:
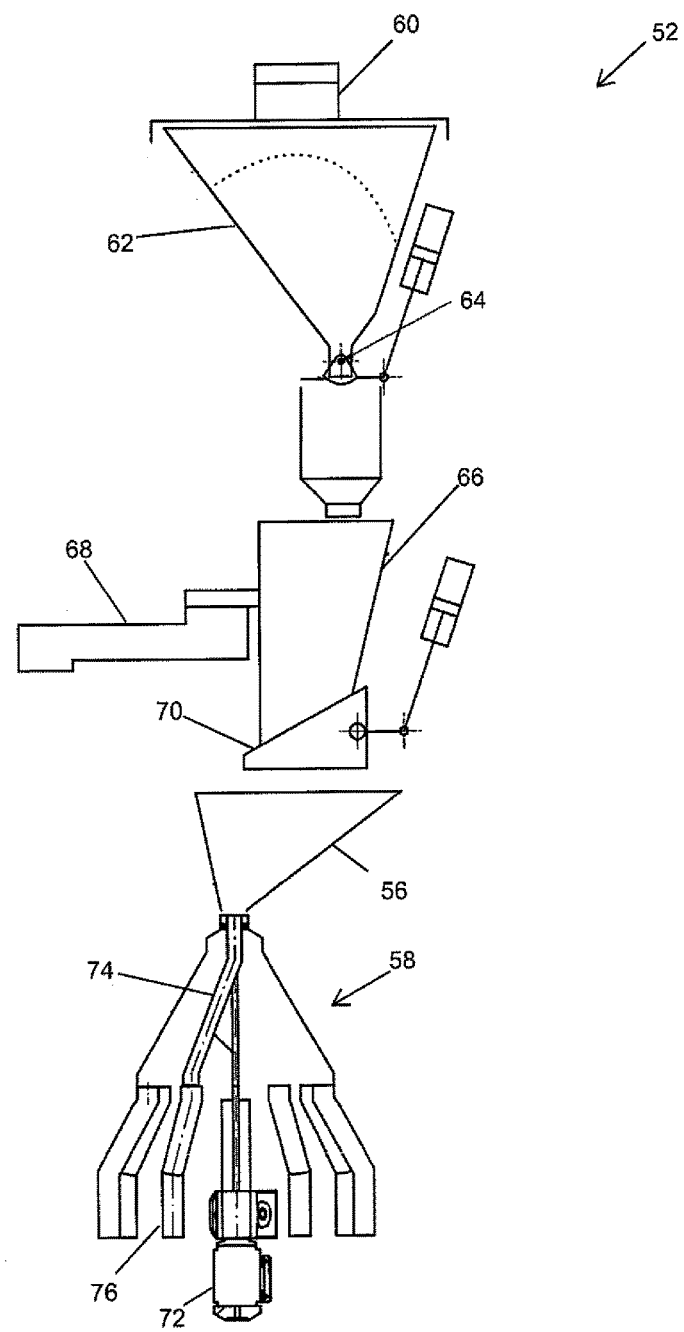
FIG. 5 schematically shows a cross-sectional view of one of the weighing stations of the MCGBB and the manifold of the MCGBB.

An embodiment of the MCGBB of the invention will be described with reference to FIG. 4, which schematically shows a perspective view of the MCGBB, and FIG. 5, which schematically shows a cross-sectional view of one of the weighing stations of the MCGBB and the manifold of the MCGBB.

The MCGBB 50 is a modular one that can be comprised of several weighing units 52 arranged in a way that allows the material weighed in each of the units to fall through individual chutes 54 via a common funnel 56 into a manifold 58 that distributes the weighed batches to the processing machines. The weighing units 52 each contain a single type of resin, masterbatch, or additive in granular form. A computer (not shown in the figures) controls the operation of each of the separate weighing units 52 in order to supply the exact weight of each of the individual components to the funnel 56.

Each weighing unit 52 comprises a hopper loader feeder 60 that draws one type of material, i.e. resin, masterbatch, or additive, from a raw material silo or container into material hopper 62. Hopper 62 has an opening with a feeding system 64 e.g. a flap, an auger, a screw, a vibratory mechanism, or paddles, at its bottom, which is opened and closed or activated when required by an element (not shown in the figure) that is controlled by a system computer (not shown in the figure) to allow a controlled amount of material to fall by gravity into weighing station 66 where it is weighed on a load cell 68.

The weighing stations 52 work in parallel, each weighing a required amount of material according to instructions received from the computer. When the computer determines that the correct weight of material introduced into weighing station 66 and weighed by the load cell 68 is equal to the required weight, then the system computer closes the feeding system 64 at the bottom of hopper 62. The computer activates motor 72, which rotates distributor pipe 74 in manifold 58, to complete a path from the bottom of funnel 56 to the delivery pipe 76 that leads to a specific processing machine in the plant. When the computer determines that the correct weights of each of the components of a batch to be sent to the specific processing machine have been weighed, the computer opens a flap 70 at the bottom of each of the relevant weighing stations 52 allowing the weighed amount of the components of the batch to flow by gravity through chutes 54 into funnel 56 through distribution pipe 74 and delivery pipe 76 through which a vacuum feeder draws the unmixed batch of material to the designated processing machine.

Figure 6:
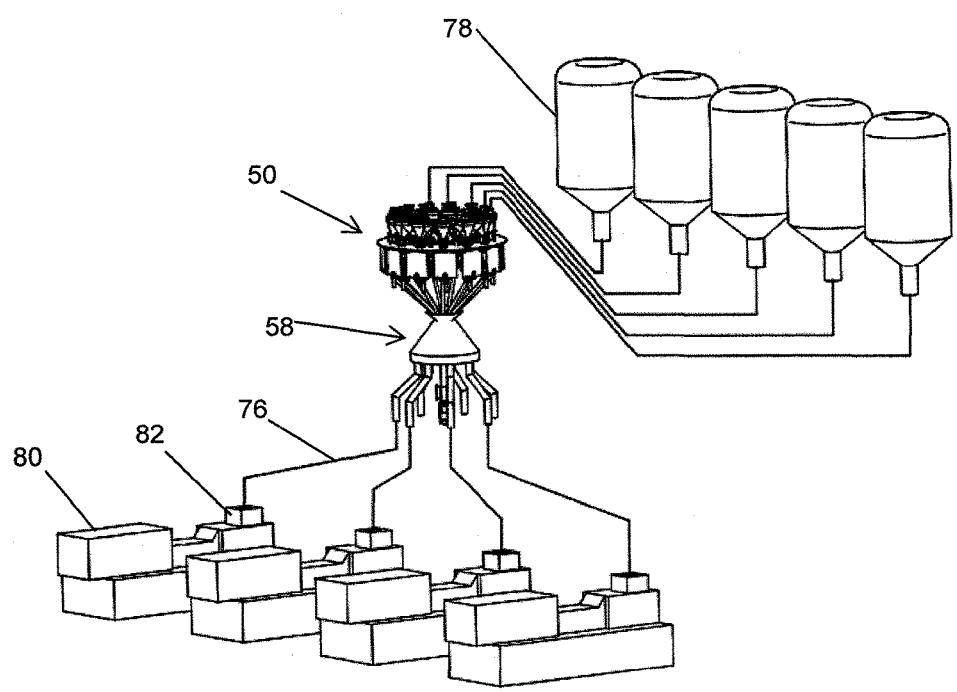
FIG. 6 schematically shows a typical arrangement of a plastic products manufacturing plant that incorporates a MCGBB of the invention.

FIG. 6 schematically shows a typical arrangement of a plastic products manufacturing plant that incorporates a MCGBB of the invention. The plant comprises a plurality of silos 78 that contain the raw materials needed by the processing machines. Each of silos 78 is connected through a pipe to at least one of the weighing units of MCGBB 50. The weighed batches of material are distributed by manifold 58 through delivery pipes 76 to each of the respective processing machines 80. According to the present invention, a mixer unit 82 is located inside the free fall hopper that is connected to the inlet of each of the processing machines 80. With this arrangement, the weighed batches of material are delivered by a vacuum system directly to the mixing machine 82, where the batch is thoroughly mixed before entering the processing machine.

By replacing the remote mixers 20, 36 of the prior art with a plurality of local mixers at each of the processing machines and replacing the prior art automatic manifold 22 with the manifold 58, the present invention provides a direct route for the material for each batch directly to the processing machine, thereby minimizing the locations where material from previous batches could contaminate succeeding batches. In order to further prevent contamination, in the system of the invention the section of the funnel 56 and distributor pipe 74 of the manifold 58 that is common to all batches is automatically cleaned with high-pressure air after each time a batch is sucked through them by the vacuum system on the processing machines. In addition the problem of separation of the components of the weighed batches is solved by only mixing the batch at the processing machine. Finally, moving the mixer from the prior art RCGB 10 and Weighing and Mixing System 30 typically reduces the height of the MCGBB 50 by up to 1 meter.

The advantages of the system of the invention will be demonstrated by comparison with a typical prior art system. As an example we consider a manufacturing plant that makes use of ten different raw materials that are stored in silos. The blend of each batch is comprised of a combination of up to four different types of raw material. The plant has 100 injection machines and 60 remote gravimetric blenders that transport the batches to the injection machines via automatic manifolds.

In the prior art system, in order for each gravimetric blender to be able to prepare the blends required it must comprise four bins. In order to supply four types of material from the silos to each of the gravimetric blenders, 240 hopper loaders and pipes are needed.

In the system of the invention the raw material has to come from the silos to the hoppers of, for example, only twelve weighing units of the MCGBB. The savings in space and expense of 228 bins/hoppers, hopper loaders, and corresponding piping is very great.

The MCGBB produces batches of material for each processing machine according to its exact individual requirements. The control system of the system of the invention is programmed such that none of the processing machines ever has to wait for its exact batch. Because of the serial way in which the raw material is weighed in a RCGB, there sometimes arises delays in supplying batches to the processing machines. The prior art solution to this problem is to use buffer containers beside or underneath the gravimetric blenders that need space and contribute to separation of each batch. Furthermore in order to enable at least part of the gravimetric blenders of the RCGB to supply two or more processing machines the solution is to compromise with batches of "average", and sometimes more expensive, composition. Because each weighing unit of the MCGBB can supply raw material to more than one processing machine there is no need to make such compromises as are sometimes necessary with a RCGB.

With a RCGB as described above, if it becomes necessary to change the type of raw material supplied to the bins in the gravimetric blenders, that gravimetric blender must be shut down and thoroughly emptied of the previous material and thoroughly cleaned. An advantage of the MCGBB is that, because each of the raw materials has at least one weighing unit dedicated to it, there is no necessity of changing material in a hopper, which leads to a large savings in time and expense and also prevents any possibility of contamination.

Since one MCGBB can serve in most of the cases at least 24 processing machines, therefore, due to its dimensions, five MCGBBs that require together 20-30 square meters of floor space instead of 200-300 square meters by a RCGB comprised of 60 gravimetric blenders.

Although embodiments of the invention have been described by way of illustration, it will be understood that the invention may be carried out with many variations, modifications, and adaptations, without exceeding the scope of the claims.

The invention claimed is:

1. A weighing apparatus for the preparation of a mixture of granular components that comprise batches of material required by a plurality of processing machines in a plant for the manufacture of plastic products, the apparatus comprising:
   a) a Multi-Channel Gravimetric Batch Blender (MCGBB) configured to weigh predetermined weights of the raw materials and to combine the weighed portions of raw materials into batches according to a predetermined recipe for each processing machine, said MCGBB comprising several weighing units arranged in a way that allows material weighed in each of the weighing units to fall through individual chutes via a common funnel into a manifold that distributes the weighed batches to several processing machines via a system of delivery pipes; and
   b) a computer that controls the operation of all components of the MCGBB;
   wherein:
      i) each weighing unit comprises:
         a) a material hopper;
         b) a hopper loader feeder configured to draw one type of raw material from a raw material silo into the material hopper;
         c) a weighing station comprising a load cell;
         d) an opening with a feeding system at the bottom of the material hopper, the feeding system configured to be opened and closed or activated on command of the apparatus's computer to allow a controlled amount of material to fall by gravity from the material hopper into the weighing station; and
         e) an opening with a flap at the bottom of the weighing station, the flap configured to be opened and closed on command of the apparatus's computer to allow the weighed amount of material to fall by gravity from the weighing station via the funnel into the hopper;
      ii) the weighing stations are configured to work in parallel, each weighing a required amount of material for one component of the batches of material; and
      iii) the computer is configured to determine when the correct weights of all of the materials required for a batch to be sent to a specific processing machine has been weighed by the weighing stations and then to open the flaps at the bottoms of the weighing stations allowing all of the weighed components of the batch to fall by gravity into the funnel;
   the apparatus characterized in that, before the weighed amounts of material required for a batch to be supplied to a specific processing machine are allowed to fall into the funnel, the computer is configured to activate a motor configured to rotate a distributor pipe in the manifold, thereby connecting the bottom of the funnel to the delivery pipe that leads to the specific processing machine.

2. The apparatus of claim 1 wherein the funnel and distributor pipe in the manifold are automatically cleaned by high pressure air after the preparation of each batch.

3. The apparatus of claim 1, wherein the MCGBB comprises twelve weighing units and supplies batches of material to one hundred injection machines.

4. A weighing and mixing system for the preparation of a mixture of granular components required by a plurality of processing machines in a plant for the manufacture of a plastic product, the system comprising:
   a) a plurality of raw material silos;
   b) at least one Multi-Channel Gravimetric Batch Blender (MCGBB) according to claim 1;
   c) one mixer unit located at each of the processing machines;
   wherein, the system of delivery pipes is configured to deliver predetermined batches of material from the MCGBB to the mixers at the processing machines.

5. The system of claim 4, wherein each silo is connected by piping to at least one weighing unit and each weighing unit is connected to only one silo.

6. The system of claim 4, wherein one computer controls the operation of more than one MCGBB.

7. The weighing and mixing system of claim 1, wherein the feeding system at the bottom of the material hopper comprises one of a flap, an auger, a screw, a vibratory mechanism, and paddles.

* * * * *